(12) United States Patent
Yao et al.

(10) Patent No.: US 8,056,133 B1
(45) Date of Patent: Nov. 8, 2011

(54) PROTECTING COMPUTERS FROM VIRUSES IN PEER-TO-PEER DATA TRANSFERS

(75) Inventors: Pei-Chun Yao, Taipei (TW); Chia-Chi Chang, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 1504 days.

(21) Appl. No.: 11/494,402

(22) Filed: Jul. 26, 2006

(51) Int. Cl.
*G06F 11/00* (2006.01)
*G06F 12/14* (2006.01)
*G06F 12/16* (2006.01)
*G08B 23/00* (2006.01)

(52) U.S. Cl. ........................................................ 726/24
(58) Field of Classification Search ................... 726/24
See application file for complete search history.

(56) References Cited

U.S. PATENT DOCUMENTS

| | | | | |
|---|---|---|---|---|
| 5,623,600 | A * | 4/1997 | Ji et al. ............................. | 726/24 |
| 6,195,587 | B1 * | 2/2001 | Hruska et al. ..................... | 700/2 |
| 6,721,721 | B1 * | 4/2004 | Bates et al. ......................... | 1/1 |
| 6,938,097 | B1 * | 8/2005 | Vincent et al. ................ | 709/240 |
| 7,010,807 | B1 * | 3/2006 | Yanovsky ........................ | 726/24 |
| 7,096,215 | B2 * | 8/2006 | Bates et al. ......................... | 1/1 |
| 7,293,177 | B2 * | 11/2007 | Lahti et al. ..................... | 713/188 |
| 7,363,657 | B2 * | 4/2008 | Caccavale ....................... | 726/24 |
| 7,523,487 | B2 * | 4/2009 | Muhlestein ...................... | 726/3 |
| 7,577,721 | B1 * | 8/2009 | Chen ............................. | 709/219 |
| 7,689,532 | B1 * | 3/2010 | Levy .............................. | 713/176 |
| 7,739,238 | B2 * | 6/2010 | Strickland ...................... | 707/622 |
| 7,756,892 | B2 * | 7/2010 | Levy .............................. | 707/781 |
| 7,844,549 | B2 * | 11/2010 | Strickland ....................... | 705/59 |
| 2002/0052885 | A1 * | 5/2002 | Levy .............................. | 707/200 |
| 2002/0103783 | A1 * | 8/2002 | Muhlestein ....................... | 707/1 |
| 2002/0129277 | A1 * | 9/2002 | Caccavale ...................... | 713/201 |
| 2003/0046586 | A1 * | 3/2003 | Bheemarasetti et al. ..... | 713/201 |
| 2003/0046587 | A1 * | 3/2003 | Bheemarasetti et al. ..... | 713/201 |
| 2003/0088680 | A1 * | 5/2003 | Nachenberg et al. ......... | 709/229 |
| 2004/0098370 | A1 * | 5/2004 | Garland et al. .................... | 707/1 |
| 2004/0148281 | A1 * | 7/2004 | Bates et al. ........................ | 707/3 |
| 2004/0158730 | A1 * | 8/2004 | Sarkar ............................ | 713/200 |
| 2005/0033975 | A1 * | 2/2005 | Lahti et al. ..................... | 713/200 |
| 2005/0060721 | A1 * | 3/2005 | Choudhary et al. .......... | 719/318 |
| 2005/0149749 | A1 * | 7/2005 | Van Brabant ................. | 713/200 |
| 2005/0198020 | A1 * | 9/2005 | Garland et al. .................... | 707/3 |
| 2006/0206486 | A1 * | 9/2006 | Strickland ......................... | 707/9 |

(Continued)

OTHER PUBLICATIONS

EDonkey network—Wikipedia, the free encyclopedia, Jul. 12, 2006, 3 sheets [retrieved on Jul. 12, 2006]. Retrieved from the internet: http://en.wikipedia.org/wiki/EDonkey_network.

(Continued)

*Primary Examiner* — David García Cervetti
(74) *Attorney, Agent, or Firm* — Okamoto & Benedicto LLP (57) ABSTRACT

In one embodiment, a peer-to-peer (P2P) protect server may include a crawler to obtain files available for P2P data transfer. The P2P protect server may employ a scan engine to scan the files for computer viruses, and store the results of the scanning in a database. A P2P protect application running in a P2P client may request the P2P protect server for information on whether or not a particular file available for P2P data transfer is infected with a computer virus. This allows the user of the P2P client to make an informed decision before downloading the file from another P2P client.

12 Claims, 6 Drawing Sheets

U.S. PATENT DOCUMENTS

| | | | | |
|---|---|---|---|---|
| 2006/0224670 | A1* | 10/2006 | Kubota | 709/204 |
| 2007/0061266 | A1* | 3/2007 | Moore et al. | 705/51 |
| 2007/0150948 | A1* | 6/2007 | De Spiegeleer | 726/22 |
| 2007/0260871 | A1* | 11/2007 | Paya et al. | 713/151 |
| 2008/0052783 | A1* | 2/2008 | Levy | 726/26 |
| 2010/0281545 | A1* | 11/2010 | Levy | 726/30 |
| 2010/0306257 | A1* | 12/2010 | Levy | 707/770 |

OTHER PUBLICATIONS

John Borland, CNet News.Com"P2P users traveling by eDonkey", Aug. 29, 2005, 2 sheets [retrieved on Jul. 12, 2006]. Retrieved from the internet: http://news.com/2102-1025_3-5843859.html?tag=st.util.print.

* cited by examiner

PROTECTING COMPUTERS FROM VIRUSES IN PEER-TO-PEER DATA TRANSFERS

BACKGROUND OF THE INVENTION

1. Field of the Invention

The present invention relates generally to computer networks, and more particularly but not exclusively to peer-to-peer data transfers.

2. Description of the Background Art

Peer-to-peer ("P2P") refers to computer networking that allows one computer to directly communicate with another computer with little or no assistance from a central server. P2P networks are widely employed in both home and business environments to transfer data, such as files for music, word processing, spreadsheet, video, and so on. Although P2P networks may have varying implementation details, most P2P networks allow files to be transferred directly from one computer to another. P2P networks may be implemented on the Internet. On the Internet, a P2P network typically requires the services of a P2P server to provide a directory of computers, referred to herein as "P2P clients," that have a particular file. A P2P client identified as having the particular file may provide that file directly (i.e., without going through an intermediary computer) to another P2P client in a P2P data transfer.

One problem with P2P networks is that direct data exchange between two P2P clients may facilitate transfer of computer viruses. Viruses are especially problematic in P2P networks operating over the Internet because there are a lot of P2P clients that are operated by unknown individuals, who may not have antivirus in their computers or have malicious intentions (e.g., hackers, virus coders). Techniques for protecting computers from viruses in P2P data transfers are thus generally desirable.

SUMMARY

In one embodiment, a P2P protect server may include a crawler to obtain files available for P2P data transfer. The P2P protect server may employ a scan engine to scan the files for computer viruses, and store the results of the scanning in a database. A P2P protect application running in a P2P client may request the P2P protect server for information on whether or not a particular file available for P2P data transfer is infected with a computer virus. This allows the user of the P2P client to make an informed decision before downloading the file from another P2P client.

These and other features of the present invention will be readily apparent to persons of ordinary skill in the art upon reading the entirety of this disclosure, which includes the accompanying drawings and claims.

DESCRIPTION OF THE DRAWINGS

FIGS. 4(*a*), 4(*b*), and 4(*c*) pictorially illustrate an example operation of a P2P protect application working with a P2P protect server in accordance with an embodiment of the present invention.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that some components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more software components, which may be executed by a processor. Components may be implemented separately in multiple modules or together in a single module.

Computer viruses, worms, Trojans, and spyware are examples of malicious codes that have plagued computer systems throughout the world. Although there are technical differences between each type of malicious code, malicious codes are collectively referred to herein as "viruses."

Figure 1:
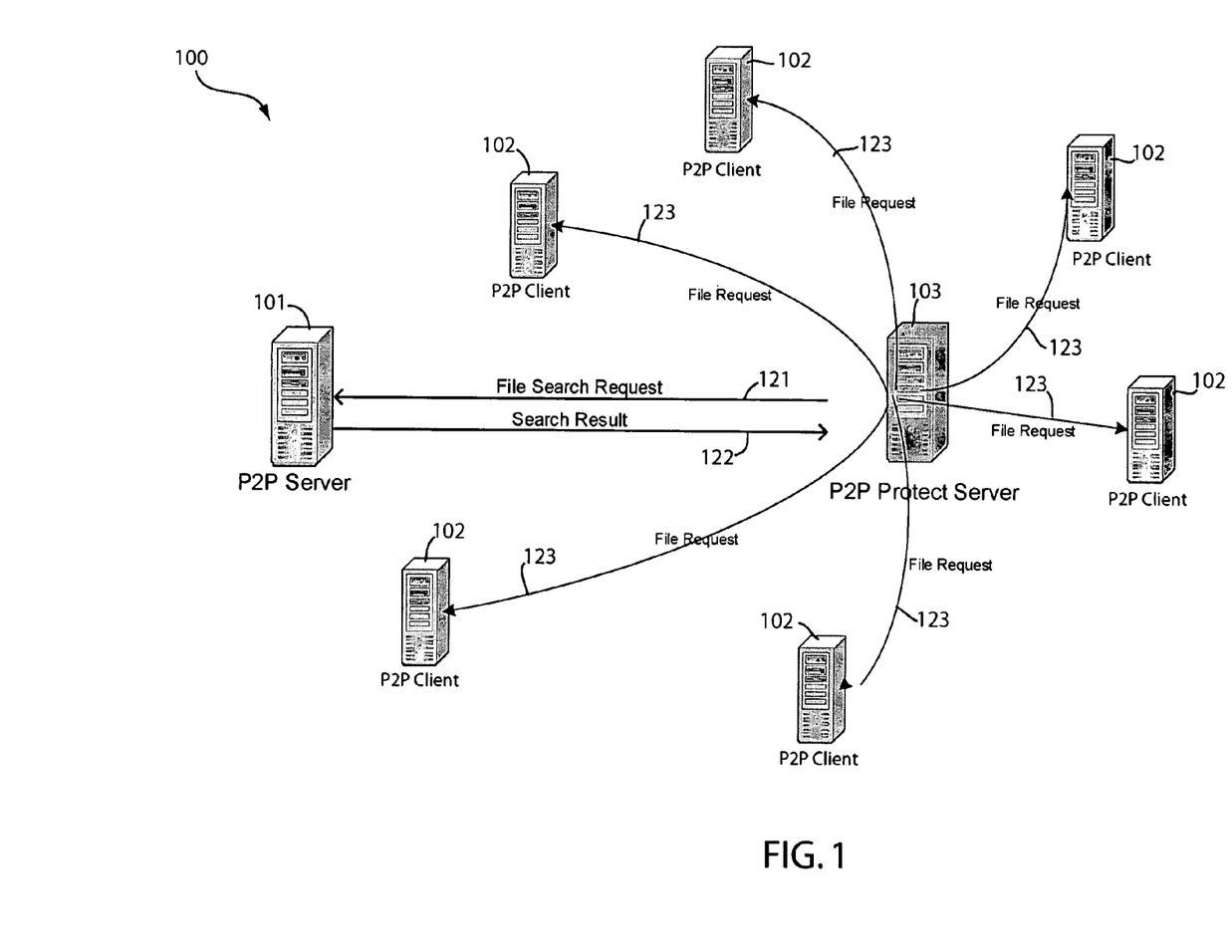
FIGS. 1 and 2 schematically show a P2P network in accordance with an embodiment of the present invention.
Figure 2:
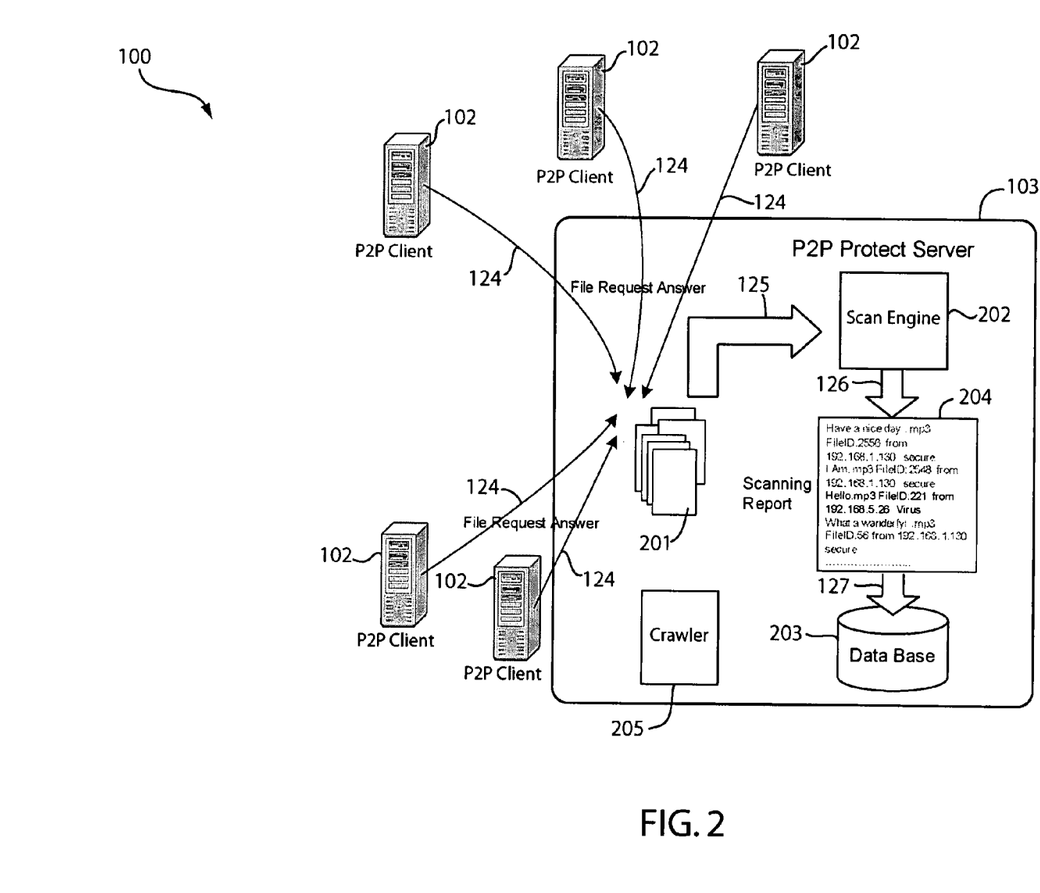

FIGS. 1 and 2 schematically show a peer-to-peer (P2P) network 100 in accordance with an embodiment of the present invention. The P2P network 100 may include one or more P2P servers 101, a plurality of P2P clients 102, and a P2P protect server 103. In one embodiment, the computers of the P2P network 100 communicate over the Internet. As such, arrows 121-123 in FIG. 1 and arrows 124 in FIG. 2 represent Internet connections. The P2P network 100 may be operated over public or private computer networks without detracting from the merits of the present invention.

The P2P server 101 may comprise a computer configured to provide directory assistance to the P2P clients 102. The P2P server 101 may be configured to have a database of which P2P clients 102 have which particular files or other data for download to other P2P clients 102. For example, the P2P server 101 may maintain and provide to P2P clients 102 metadata containing filenames, publication dates, and other file information. Each metadata may have a unique identity on the P2P server 101 even though the file name in the metadata may be the same. For example, each metadata may have a globally unique ID that may be used to identify a file; the globally unique ID may be computed by hashing the file's contents.

A user on a P2P client 102 may send a file search request to the P2P server 101 to obtain a search result that lists other P2P clients 102 that may have the file the user is looking for. For example, a P2P client 102 may send a file search request to the P2P server 101. In response, the P2P server 101 may send the P2P client 102 a search results list of peers (i.e., other P2P clients 102) with relevant files, and each of the peers' ID and address (e.g., IP address and port). There may be more than one P2P server in any given P2P network; only one P2P server 101 is shown in the P2P network 100 for clarity of illustration. Examples of P2P servers 101 on the Internet include those for emule and BitTorrent.

The P2P protect server 103 may comprise a computer configured to scan for viruses'files or other data available for download from the P2P clients 102, to maintain a database of the results of the virus scans, and to inform a P2P client 102 of the result of a virusscan of a particular file. As shown in FIG. 2, a P2P protect server 103 may comprise a crawler 205, a scan engine 202, and a database 203.

The crawler 205 may comprise computer-readable program code for obtaining files or other data available for download from P2P clients. In one embodiment, the crawler 205 sends file search requests to one or more P2P servers 101 to obtain search results that list files available for download from P2P clients 102, and then downloads the listed files from their respective P2P clients 102 to the P2P protect server 103.

The scan engine 202 may be configured to scan files or other data for viruses. The scan engine 202 may be implemented in software, hardware, or combination of both. In one embodiment, the scan engine 202 comprises commercially-available antivirus software, such as those available from Trend Micro, Inc.

The database 203 may comprise computer-readable program code for storing information about files available for download from P2P clients. In one embodiment, the database 203 is configured to indicate the names of files available for P2P data transfer in the P2P network 100, the P2P clients 102 from which the crawler 205 obtained the files, and the results of the virus scan performed by the scan engine 202 on the files. For example, the database 203 may indicate the name of a file, address information (e.g., IP address and port number) of the P2P client 102 hosting the file, file format, the file's security label (e.g., whether or not the file is infected with a virus), and other file information.

Figure 3:
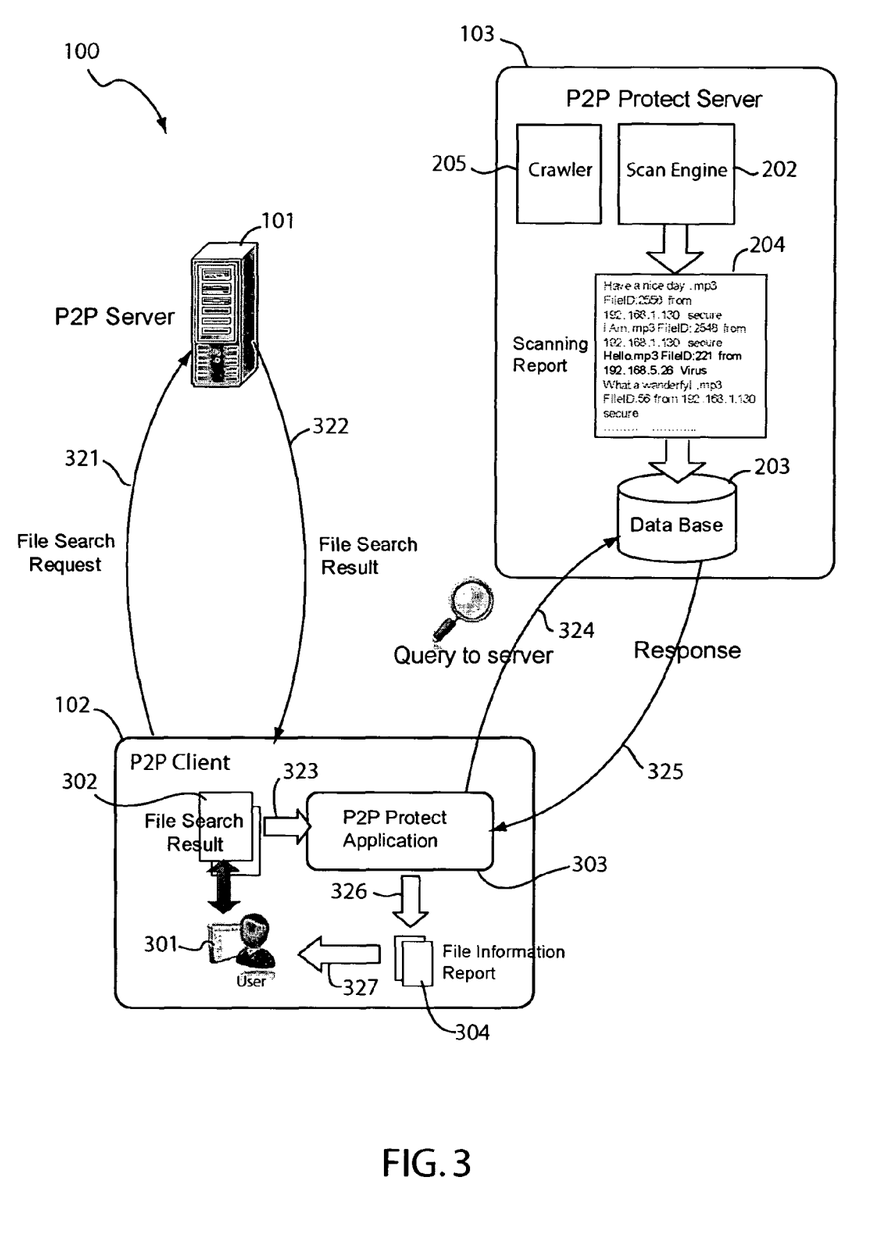
FIG. 3 schematically shows how a P2P client can take advantage of the services of a P2P protect server, in accordance with an embodiment of the present invention.

A P2P client 102 may comprise a computer configured to perform P2P data transfers in a P2P network. In one embodiment, a P2P client 102 is configured to send a file search request to the P2P server 101, receive a responsive file search result from the P2P server 101, upload (i.e., provide) files or other data directly to other P2P clients 102, and download (i.e., receive) files or other data directly to other P2P clients 102. As shown in FIG. 3, a P2P client 102 may include a P2P client application 301 and a P2P protect application 303.

A P2P client application 301 may comprise computer-readable program code for exchanging files or other data directly between two P2P clients in a P2P data transfer. In one embodiment, the P2P client application 301 is configured to allow a P2P client 102 to exchange files or other data directly with other P2P clients 102. The P2P client application 301 may comprise a commercially available P2P client, such as those for the eDonkey P2P network, for example.

A P2P protect application 303 may comprise computer-readable program code for providing a P2P client information about files available for P2P data transfer. In one embodiment, the P2P protect application 303 is configured to parse a file search result received by the P2P client 102 from the P2P server 101, query the P2P protect server 103 for information on a file listed as available for download from another P2P client 102, and display information about the file in the P2P client. In one embodiment, the P2P protect application 303 queries the P2P protect server 103 whether or not a file has a virus and displays the result of the query in the P2P client 102.

An example operation of the aforementioned components is now illustrated beginning with FIG. 1. In operation, the crawler 205 (see FIG. 2) in the P2P protect server 103 sends a file search request to the P2P server 101 (arrow 121). The file search request comprises a request for information on files available for P2P data transfer in the P2P network 100. In response to the file search request, the P2P server 101 provides a search result to the P2P protect server 103 (arrow 122). The search result may include a listing of P2P clients 102 (including their address information) from which the file may be obtained by P2P data transfer. The crawler 205 may repeatedly send file search requests to one or more P2P servers 101 to determine the locations of a plurality files or other data available for P2P download in the P2P network 100.

The crawler 205 parses the search result it receives from the P2P server 101, and sends a file request to each P2P client 102 hosting a file listed in the search result (arrows 123). That is, the crawler 205 goes through search results received from the P2P server 101 and, for each file listed in the search results, downloads the file from the hosting P2P client 102.

Turning to FIG. 2, in response to the file requests, the P2P clients 102 provide the requested files to the P2P protect server 103 (arrows 124). The crawler 205 feeds the files, labeled as "201" in FIG. 2, to the scan engine 202 for virus scanning (arrow 125). The scan engine scans the files 201 for viruses and generates a scanning report 204 containing the results of the virus scans (arrow 126). In one embodiment, the scanning report identifies each scanned file 201 by its filename, identifies by address the P2P client 102 from which the file 201 was downloaded, and indicates whether or not the file 201 has a virus. Information from the scanning report 204 is stored in the database 203 for subsequent retrieval (arrow 127). The database 203 thus provides a blacklist that may be consulted to determine whether or not a particular file from a P2P client 102 is infected with a virus.

FIG. 3 schematically shows how a P2P client 102 can take advantage of the services of the P2P protect server 103, in accordance with an embodiment of the present invention. In the example of FIG. 3, a user on a P2P client 102 may employ a P2P application 301 to send a file search request to the P2P server 101 (arrow 321). In response to the file search request, the P2P server 101 sends the P2P client 102 a file search result 302 that lists relevant files available for P2P data transfer from one or more P2P clients 102 (arrow 322). The P2P protect application 303 detects the reception of the file search result 302 in the P2P client 102, and proceeds to parse the file search result 302 for the files available for P2P data transfer (arrow 323). For each file identified in the file search result 302, the P2P protect application 303 queries the P2P protect server 103 for information on the file including whether or not the file is infected with a virus (arrow 324). The P2P protect application 303 may identify a file by file name, the address of the P2P client hosting the file, and/or the file's globally unique ID. In response to the query, the P2P protect server 103 informs the P2P protect application 303 of the security status of the file, including the result of the virus scan performed by the scan engine 202 on the file (arrow 325). The P2P protect server may pull the result of the virus scan from the database 203, which stores information from scanning reports 204. The file may be one of the files previously obtained by the crawler 205. If not, the crawler 205 may obtain the file, feed the file to the scan engine 202 for scanning, which may then store the result of the scanning in the database 203.

Based on the response from the P2P protect server 103, the P2P protect application 303 generates a file information report 304 (arrow 326). The file information report 304 may include the result of virus scanning the file, i.e., whether or not the file is virus-infected. The file information report 304 may include additional information, such as a warning to the user in the event a file listed in the file search result 302 is virus-infected. The P2P protect application 303 presents the file information report 304 to the user (arrow 327). The P2P protect application 303 may display the file information report 304 to the user in a variety of ways including using a message box, a balloon, an audio message, and so on.

As can be appreciated, the P2P protect application 303 in conjunction with the P2P protect server 103 advantageously allow the user to determine whether a file is infected with a virus even before the user directly downloads the file to her computer by P2P data transfer. Rather than checking the file for viruses after the file has been downloaded, the user can simply avoid the trouble and possible security issues associated with downloading a virus-infected file.

Figure 4A:
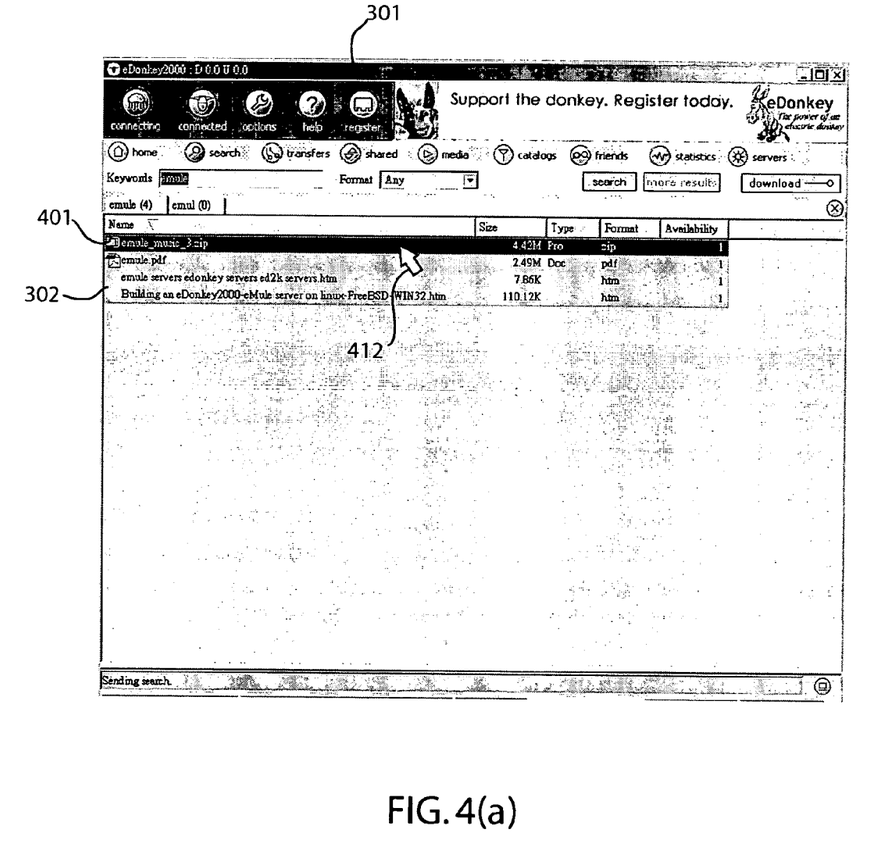
Figure 4B:
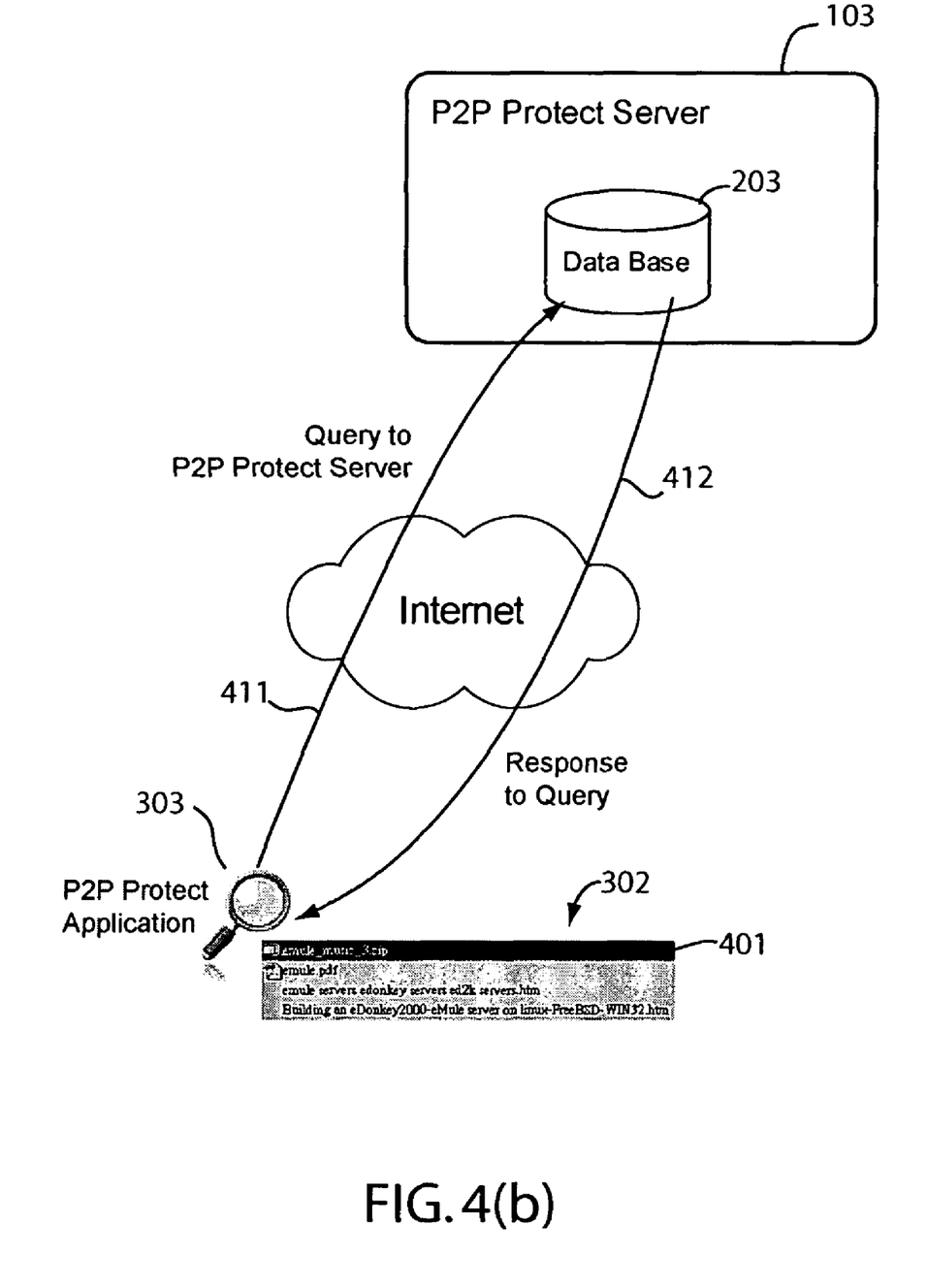
Figure 4C:
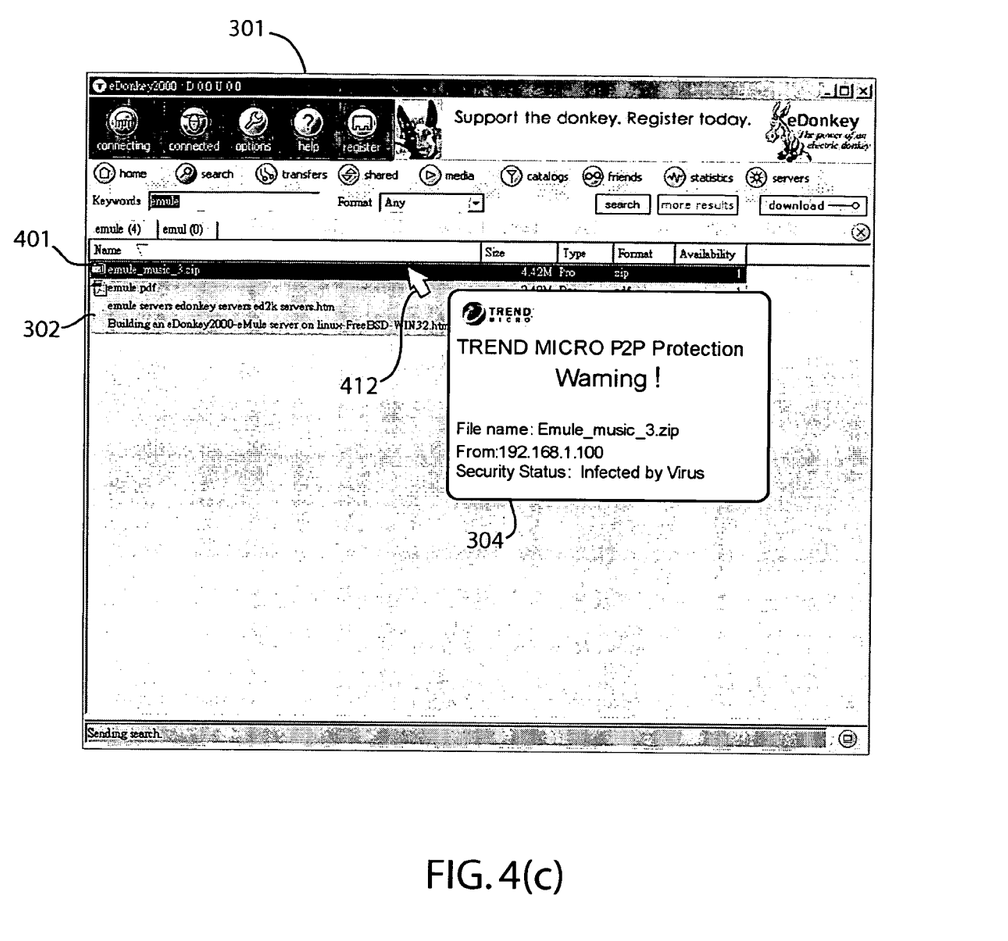

FIG. 4, which consists of FIGS. 4(a), 4(b), and 4(c), pictorially illustrates an example operation of the P2P protect application 303 working with the P2P protect server 103, in accordance with an embodiment of the present invention. FIG. 4(a) shows a UI (user interface) of a P2P client application 301 displayed in a computer screen of a P2P client 102. The user employed the P2P client application 301 to send a file search request to the P2P server 101. In the example of FIG. 4(a), the user searched for a file using the keyword "emule." In response to the user's file search request, the P2P server 101 provided a file search result 302 that lists files available for download by P2P data transfer and having filenames that include the keyword "emule." The contents of the file search result 302 and the addresses of the P2P clients 102 hosting the files may be obtained by the P2P protect application 303 from the P2P client application 301 using a plug-in module that intercepts network traffic in the P2P client 102, for example. Prior to downloading a file listed on the search result 401, the user may invoke the functionality of the P2P protect application 303 to determine whether or not the file is safe to download. In one embodiment, the user may do so by pointing a mouse cursor 412 on the file of interest, which is file 401 ("emule_music_3.zip") in the example of FIG. 4(a), and then clicking the mouse's right button (i.e., a right click).

As shown in FIG. 4(b), the P2P protect application 303 may query the P2P protect server 103 (arrow 411) for information on the file 401 (e.g., identified by filename and address of the P2P client 102 hosting it) or other files listed in the file search result 302. As part of the query, the P2P protect application 303 may provide the P2P protect server 103 the globally unique ID that uniquely identifies the file 401. In response to the query, the P2P protect server 103 retrieves from the database 203 information about the file 401, including the result of virus scanning the file 401, and provides that information to the P2P protect application 303 (arrow 412). As shown in FIG. 4(c), the P2P protect application 303 displays the result of the virus scan of the file 401 when the user right clicks on the file 401. In the example of FIG. 4(c), the P2P protect application 303 displays the result of the virus scan in a message 304. Because the file 401 is infected with a virus in this example, the message 304 also includes a warning to alert the user.

Methods and apparatus for protecting computers from viruses in P2P data transfers have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of protecting computers from viruses in a peer-to-peer (P2P) data transfer, the method comprising:
   sending a file search request from a P2P protect server computer to a P2P server to determine locations of a plurality of files from a plurality of P2P client computers available for P2P data transfer in a P2P network, the P2P protect server computer being separate from the P2P server;
   scanning for computer viruses the plurality of files from the plurality of P2P client computers identified in a response to the file search request, wherein the P2P protect server computer scans the plurality of files available from the plurality of P2P client computers for computer viruses;
   storing results of scanning the plurality of files from the plurality of P2P client computers in the P2P protect server computer;
   receiving in a first P2P client computer a listing of files available for P2P data transfer in the P2P network, the listing of files indicating a first file that may be downloaded directly from a second P2P client computer to the first P2P client computer in a P2P data transfer, wherein the first P2P client computer receives the listing of files available for P2P data transfer from the P2P server;
   sending a query from the first P2P client computer to the P2P protect server computer to inquire whether the first file is infected with a computer virus;
   receiving a response in the first P2P client computer, the response coming from the P2P protect server computer and including a result of scanning the first file for computer viruses; and
   prior to downloading the first file directly from the second P2P client computer to the first P2P client computer, displaying in the first P2P client computer the result of scanning the first file for computer viruses.

2. The method of claim 1 wherein the result of scanning the first file for computer viruses is displayed in the first P2P client computer along with a warning when the result indicates that the first file is virus-infected.

3. The method of claim 1 wherein the P2P protect server and the first P2P client computer communicate over the Internet.

4. The method of claim 1 wherein the results of scanning the plurality of files are stored in a database in the P2P protect server computer.

5. The method of claim 1 wherein the result of scanning the first file for computer viruses is displayed when a user on the first P2P client computer uses a mouse to right click on a filename of the first file as displayed in the listing of files available for P2P data transfer in the P2P network.

6. A server computer comprising:
   a crawler configured to obtain files available for P2P data transfer from a plurality of P2P clients in a P2P network;
   a scan engine configured to scan files obtained by the crawler for computer viruses;
   a database configured to store results of scanning the files obtained by the crawler for computer viruses;
   wherein the server computer is configured to consult the database to inform a first P2P client in the plurality of P2P clients whether or not a particular file available for P2P data transfer from a second P2P client in the plurality of P2P clients is infected with a computer virus prior to the first P2P client downloading the particular file directly from the second P2P client.

7. The server computer of claim 6 wherein the plurality of P2P clients communicate over the Internet.

8. The server computer of claim 6 wherein the crawler is configured to send a file search request to a P2P server to determine locations of the files available for P2P data transfer.

9. The server computer of claim 6 wherein the server computer informs the first P2P client whether or not the particular file has a computer virus in response to a query from a P2P protect application running in the first P2P client.

10. A method of protecting computers from viruses in a P2P data transfer, the method to be performed in a first computer and comprising:
   parsing a file search result that lists files available for P2P data transfer;

querying a third computer whether or not a particular file is infected with a computer virus, the particular file being indicated in the file search result and available from a second computer, wherein the third computer stores results of scanning files identified in the file search result for computer viruses;

receiving from the third computer a response to the query; and displaying in the first computer information on whether or not the particular file is infected with a computer virus prior to the particular file being directly downloaded from the second computer to the first computer in a P2P data transfer, wherein the first computer receives the file search result from a fourth computer configured to keep a directory of locations of files available for P2P data transfer in a P2P network that includes the first and second computers, the fourth computer being separate from the third computer.

11. The method of claim 10 wherein the third computer scans the particular file for computer viruses.

12. The method of claim 10 wherein the first, second, and third computers communicate over the Internet.

* * * * *